Patented June 24, 1930

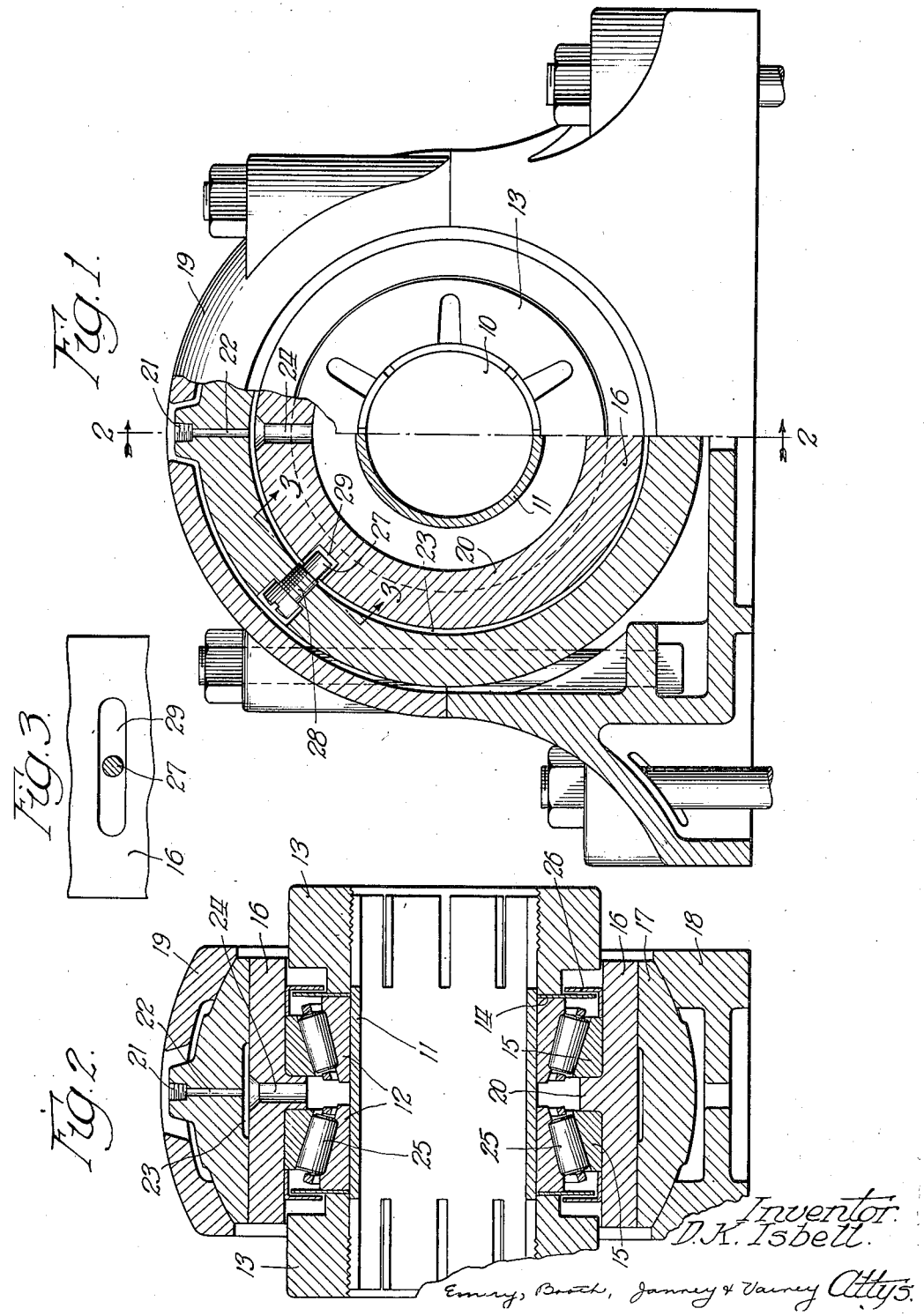

1,765,978

UNITED STATES PATENT OFFICE

DONALD K. ISBELL, OF MISHAWAKA, INDIANA, ASSIGNOR TO DODGE MANUFACTURING CORPORATION, A CORPORATION OF DELAWARE

BEARING

Application filed January 10, 1927. Serial No. 160,042.

My invention relates to power transmission and more specifically to a rotary antifraction support, or bearing, of the type commonly used in connection with lineshafting. The invention involves an improvement in bearings of the type stated.

In the accompanying drawings,

Fig. 1 is an end view partly in section of a bearing according to the invention;

Fig. 2 is a section on line 2—2 of Fig. 1; and

Fig. 3 is a detail section on the line 3—3 of Fig. 1.

According to the invention the shaft is permitted freedom of longitudinal movement parallel to its axis sufficient to take care of slight axial displacement or changes in the length of the shaft due to temperature changes. In the illustrated form this is accomplished without impairing the function of rotary support and with a minimum of deviation from the shapes, sizes and relations of the parts obtaining in standard bearings of the prior art in which no provision is made for longitudinal movement.

In the embodiment of the invention selected for illustration the shaft 10 is supported in the first instance by a sleeve 11 which, together with its clamping and adjusting means and the rotary races 12 constitutes the entire rotary portion of the bearing. This clamping means comprises, briefly, split adjusting and clamping rings 13 at the ends of the tube 11, which rings may be turned in to adjust the axial spacing of the races 12 and then keyed in place to prevent disturbing the adjustment. Each ring may then be contracted to cause the tube to grip the shaft by the usual threaded bolt (not shown) across the split. The rotary portion of the bearing includes the oil retaining guards 14 which also function as axial spacing elements between the races or cones 12 and the adjustment rings 13.

The non-rotating portion of the bearing includes the outer races or cups 15 and three supports arranged in series; first, an inner housing 16; next, an outer housing 17; and last, the entirely stationary supporting structure including the chair 18 and the cap 19. Provision is made for relative movement by rotation in any direction about a point substantially at the center of the bearing, so that any slight wobble due to poor alignment will be taken care of; and also for a linear displacement parallel to the axis of the shaft. One movement may be between the stationary structure and the outer housing, and the other between the outer and inner housings. In the form illustrated, the axial movement is between the inner and outer housings.

Thus, the outer races are unitary during operation with the inner housing 16 and abut against a central rib 20 in said housing. The outer surface of the inner housing and the inner surface of the outer housing are true cylinders having free sliding engagement, and the outer surface of the outer housing and the inner surface of the chair and cap are portions of true spheres also having free sliding engagement.

Lubricant may be injected in any suitable way at 21 passing through a radial passageway 22 to a peripheral channel 23 formed by relieving the surface of one of the housings. From the channel 23 it finds its way through a radial passage 24 in the inner housing into the space between the races where it is retained to lubricate the antifriction elements or rollers 25 partly by the configuration of the races themselves and partly by the co-operation of the rotating grease shield 14 and a stationary grease retainer 26.

It is preferable to provide means for limiting the relative axial displacement between the inner and outer housings to prevent this movement going so far as to deprive the inner housing of adequate support from the outer housing. I have illustrated a stop pin 27 projecting from the end of a bolt 28 threaded through a countersunk hole in the outer housing. The pin 27 lies in a slot 29 in the inner housing. It prevents rotation of the inner housing by engagement with the sides of the slot and limits the axial movement of the inner housing by engagement with the ends thereof.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

What I claim is:

1. A bearing comprising, in combination, a tube to receive a shaft, means for clamping the tube frictionally in place on the shaft, an inner race carried by said tube and clamping means, an outer race, rotary anti-friction members between said races, an inner housing supporting said outer races and having a cylindrical outer surface, an outer housing slidably supporting said inner housing, said outer housing having a spherical outer surface, a chair having spherical inner surfaces receiving and supporting said outer housing, said outer housing and chair having registering irregularities of contour limiting the relative movement between them, a lubricant opening in the top of said chair, said housings having radial passages for conveying lubricant in to said rotary anti-friction members, and a circumferential channel between said housings communicating with said radial passages, said inner housing having a slot parallel to the axis, a radial opening through said outer housing, and a member mounted in said radial opening and projecting into said slot to limit both the relative rotation and the relative axial movement of said housings, the combined axial dimensions of said circumferential channel and the radial passage in the inner housing at its point of communication with said circumferential channel being not less than the axial movement permitted between said housings.

2. A bearing comprising, in combination, a tube to receive a shaft, means for clamping the tube frictionally in place on the shaft, an inner race carried by said tube and clamping means, an outer race, rotary anti-friction members between said races, an inner housing supporting said outer races and having a cylindrical outer surface, an outer housing slidably supporting said inner housing, said outer housing having a spherical outer surface, a chair having spherical inner surfaces receiving and supporting said outer housing, said outer housing and chair having registering irregularities of contour limiting the relative movement between them, a lubricant opening in the top of said chair, said housings having radial passages for conveying lubricant in to said rotary anti-friction members, and a circumferential channel between said housings communicating with said radial passages, a slot in said inner housing parallel to the axis, a radial opening through said outer housing and a member mounted in said radial opening and projecting into said slot to limit both the relative rotation and the relative axial movement of said housings.

3. A bearing comprising, in combination, a tube to receive a shaft, means for clamping the tube frictionally in place on the shaft, an inner race carried by said tube and clamping means, an outer race, rotary anti-friction members between said races, an inner housing supporting said outer races and having a cylindrical outer surface, an outer housing supporting said inner housing, the inner housing being slidable in said outer housing, said outer housing having a spherical outer surface, a chair having spherical inner surfaces receiving and supporting said outer housing, a lubricant opening in the top of said chair, said housings having radial passages for conveying lubricant in to said rotary anti-friction members, and a circumferential channel between said housings communicating with said radial passages.

4. A bearing comprising, in combination, shaft receiving means, an inner race carried by said shaft receiving means, an outer race, rotary anti-friction members between said races, a first support for said outer races and a second support slidably supporting said first support, a lubricant inlet in said second support, a lubricant passage for conveying lubricant through said first support in to said rotary anti-friction members, and a circumferential channel between said supports communicating with said inlet and passage, said channel being formed by cutting away the surface of said second support.

5. A bearing comprising, in combination, a tube to receive a shaft, means for clamping the tube frictionally in place on the shaft, an inner race carried by said tube and clamping means, an outer race, rotary anti-friction members between said races, an inner housing supporting said outer races and having a cylindrical outer surface, an outer housing supporting said inner housing, the inner housing being slidable in said outer housing, said outer housing having a spherical outer surface, and a chair having spherical inner surfaces receiving and supporting said outer housing.

6. A bearing comprising, in combination, shaft receiving means, an inner race carried by said shaft receiving means, an outer race, rotary anti-friction members between said races, an inner housing supporting said outer races and having a cylindrical outer surface, an outer housing supporting said inner housing, the inner housing being slidable in said outer housing, said outer housing having a spherical outer surface, and a chair having spherical inner surfaces receiving and supporting said outer housing.

7. A bearing comprising, in combination, shaft receiving means, an inner race carried by said shaft receiving means, an outer race, rotary anti-friction members between said races, an inner housing supporting said outer races, an outer housing supporting said inner housing, and a stationary structure receiving and supporting said outer housing, said inner and outer housings having relative longitudinal sliding movement, and said structure and outer housing having relative rotatively sliding movement, guided by spherical contact surfaces.

8. A shaft bearing device comprising, in a unit adapted to be assembled and adjusted at a factory and to be applied to a shaft without disturbing its organization or adjustment, a main support, a bearing case mounted therein comprising concentric outer and inner housings, a shaft sleeve extending through said bearing case, a shaft bearing between said sleeve and inner housing comprising concentric bearing rings and interposed bearing rollers in two adjacent annular trains arranged to sustain radial load equally and respectively to sustain opposite axial thrusts, means including adjusting means manipulatable outside the case positioning the roller trains and holding the bearing in fixed assembly with the inner housing and shaft sleeve; said inner housing of the bearing case being slidably fitted in the outer housing to slide freely in an axial direction, and the said outer housing and main support having contacting spherical surfaces concentric with the bearing to allow relative universal angular play, whereby the inner housing with the contained bearing is self-adjustable to suit the shaft alinement and movable with the shaft in response to shaft contraction and expansion.

9. A shaft bearing device, applicable to a shaft as an assembled unit, comprising shaft clamping means, surrounding interfitted housings, and a shaft bearing between the shaft clamping means and inner housing comprising concentric bearing rings and interposed bearing rollers in two adjacent annular trains arranged to sustain radial load equally and respectively to sustain opposite axial thrusts, with means including bearing adjusting means for positioning the bearing in fixed assembly with the shaft clamping means and inner housing, said inner housing being slidably mounted in the surrounding housing for movement in an axial direction, and another housing in which said surrounding housing is mounted with capacity for angular play about the center of the bearing.

In testimony whereof, I have signed my name to this specification.

DONALD K. ISBELL.